United States Patent
Kato et al.

(10) Patent No.: US 9,704,017 B2
(45) Date of Patent: Jul. 11, 2017

(54) IMAGE PROCESSING DEVICE, PROGRAM, IMAGE PROCESSING METHOD, COMPUTER-READABLE MEDIUM, AND IMAGE PROCESSING SYSTEM

(71) Applicant: FUJI XEROX CO., LTD., Tokyo (JP)

(72) Inventors: Noriji Kato, Yokohama (JP); Ryoko Usuba, Yokohama (JP); Ryota Ozaki, Yokohama (JP)

(73) Assignee: FUJI XEROX XO., LTD., Tokyo (JP)

( * ) Notice: Subject to any disclaimer, the term of this patent is extended or adjusted under 35 U.S.C. 154(b) by 253 days.

(21) Appl. No.: 14/401,862

(22) PCT Filed: Mar. 29, 2013

(86) PCT No.: PCT/JP2013/059676
§ 371 (c)(1),
(2) Date: Nov. 18, 2014

(87) PCT Pub. No.: WO2014/030378
PCT Pub. Date: Feb. 27, 2014

(65) Prior Publication Data
US 2015/0124082 A1     May 7, 2015

(30) Foreign Application Priority Data
Aug. 24, 2012  (JP) ................. 2012-184864

(51) Int. Cl.
  *G06K 9/68*    (2006.01)
  *G06K 9/00*    (2006.01)
  *H04N 7/18*    (2006.01)

(52) U.S. Cl.
  CPC ........... *G06K 9/00134* (2013.01); *H04N 7/18* (2013.01)

(58) Field of Classification Search
  CPC ......... G06T 7/0012; G06T 2207/30024; G06T 2207/10056; G06T 2207/30004; G06T 2207/30068; G06T 2207/30196; G06T 2210/41; G06T 7/11; G06T 7/40; G06T 7/60; G06T 2207/20081; G06T
  (Continued)

(56) References Cited

U.S. PATENT DOCUMENTS 7,873,223 B2 *  1/2011  Binnig ............... G06K 9/00127
                                                    382/224
8,594,410 B2 * 11/2013  Schmidt ............... G06K 9/6253
                                                    382/128
(Continued)

FOREIGN PATENT DOCUMENTS

CN      101042772 A      9/2007
CN      101114336 A      1/2008
(Continued)

OTHER PUBLICATIONS

Yoshida et al. "Image Processing for Drug Discovery Test With Cultured Cells"; English version.*
(Continued)

*Primary Examiner* — Nathnael Aynalem
(74) *Attorney, Agent, or Firm* — Sughrue Mion, PLLC

(57) ABSTRACT

An image processing device 20 acquires a plurality of captured images obtained by imaging a sample including a target cell at a plurality of different focal distances, sets an object region for detecting the target cell in at least two of the plurality of captured images, and performs determination about whether or not the target cell is included in the object region based on whether or not an image feature quantity based on change in image information in an image in-plane direction and a focal distance direction of an image in the object region in the plurality of captured images satisfies conditions defined for the target cell.

17 Claims, 6 Drawing Sheets

(58) Field of Classification Search
CPC ........ 7/73; H04N 7/18; G06K 9/00127; G06K 2207/1012; G06K 9/00134; G06K 9/4642; G06K 9/468; G01N 2800/00; G02B 21/365
USPC .................... 382/128, 133, 134; 348/79, 135
See application file for complete search history.

(56) References Cited

U.S. PATENT DOCUMENTS

| | | | |
|---|---|---|---|
| 2010/0054611 A1 | 3/2010 | Nomura | |
| 2013/0077873 A1* | 3/2013 | Bar Hillel | G06K 9/68 382/218 |

FOREIGN PATENT DOCUMENTS

| | | |
|---|---|---|
| CN | 101226155 A | 7/2008 |
| CN | 101236649 A | 8/2008 |
| EP | 1873232 A1 | 1/2008 |
| EP | 2164027 A1 | 3/2010 |
| JP | 4346923 B2 | 10/2009 |
| JP | 2011-221841 A | 11/2011 |

OTHER PUBLICATIONS

Yusuke Ehara, et al., "Human Detection From an Image Employing Reduced Number of Weak-Classifiers", SSII2012, Dai 18 Kai Symposium on Sensing Via Image Information, Jun. 1, 2012 (Jun. 1, 2012), total 5 pages, XP055265495, Retrieved from the Internet: URL:http://www.iieej.org/trans/IEVC/IEVC2012/PDF/2A-5.pdf.
Navneet Dalal, et al, "Histograms of Oriented Gradients for Human Detection", Proceedings of the 2005 IEEE Computer Society Conference on Computer Vision and Pattern Recognition (CVPR'05), vol. 1, Jun. 20, 2005 (Jun. 20, 2005), total 8 pages, XP010817365.
Ryota Ozaki, et al., "Automatic Detection of Nucleated Red Blood Cells from Microscope Images using Cell-Hog Feature", Journal of the Japan Society for Precision Engineering, vol. 79, No. 11, Jan. 1, 2013 (Jan. 1, 2013), pp. 1074-1077, XP055282213.
Communication dated Aug. 29, 2016, issued by the European Patent Office in counterpart European Application No. 13831306.9.
Written Opinion dated Jun. 11, 2013 issued by the International Searching Authority in counterpart International Patent Application No. PCT/JP2013/059676 (PCT/ISA/237).
ISR (PCT/ISA/210), issued Jun. 11, 2013, by the ISA in related Application No. PCT/JP2013/059676.
Written Opinion (PCT/ISA/237), issued Jun. 11, 2013, by the ISA in related Application No. PCT/JP2013/059676.
Takashi Yoshida, et al., "Image Processing for Drug Discovery Test With Cultured Live Cells"; Yokokawa Giho; vol. 52, No. 1; 2008; pp. 27-30.
Communication from the State Intellectual Property Office of P.R. China dated Nov. 19, 2015 in a counterpart Chinese application No. 201380038123.8.

* cited by examiner

NUCLEATED RED BLOOD CELL

−1 μm   −0.5 μm   0 μm   0.5 μm   1 μm   (FOCAL POSITION)

LYMPHOID CELL

−1 μm   −0.5 μm   0 μm   0.5 μm   1 μm   (FOCAL POSITION)

LARGE-SIZED WHITE BLOOD CELL

−1 μm   −0.5 μm   0 μm   0.5 μm   1 μm   (FOCAL POSITION)

CONTAMINANT-ATTACHED RED BLOOD CELL

−1 μm   −0.5 μm   0 μm   0.5 μm   1 μm   (FOCAL POSITION)

IMAGE PROCESSING DEVICE, PROGRAM, IMAGE PROCESSING METHOD, COMPUTER-READABLE MEDIUM, AND IMAGE PROCESSING SYSTEM

TECHNICAL FIELD

The present invention relates to an image processing device, a program, an image processing method, a computer-readable medium, and an image processing system.

BACKGROUND ART

Patent Literature 1 describes a technique in which, when diagnosing a fetus before birth, cells satisfying the conditions of the color, shape, positional relationship, area ratio, and the like of nucleated red blood cells (NRBCs, hereinafter, referred to as target cells) derived from the fetus infinitesimally included in maternal blood are searched from object images, thereby mechanically detecting NRBCs.

CITATION LIST

Patent Literature

Patent Literature 1: Japanese Patent No. 4346923

SUMMARY OF INVENTION

Technical Problem

An object of the invention is to provide an image processing device, a program, and an image processing system capable of improving detection accuracy of a target cell in images obtained by imaging the target cell compared to a case where the shape in a thickness direction of a cell is not used.

[1] According to an aspect of the invention, it provides an image processing device including: an acquisition unit that acquires a plurality of captured images obtained by imaging a sample including a target cell at a plurality of different focal distances; a setting unit that sets an object region for detecting the target cell in at least two of the plurality of captured images; a calculation unit that calculates an image feature quantity based on change in image information in an image in-plane direction and a focal distance direction of an image in the object region in the plurality of captured images; and a determination unit that performs determination about whether or not the target cell is included in the object region based on whether or not the image feature quantity satisfies conditions defined for the target cell.

[2] The image processing device according to [1], may have a configuration in which the target cell is a nucleated red blood cell having a nucleus, and the image processing device further includes: an extraction unit that extracts a nucleus candidate region to be a candidate of the nucleus from the plurality of captured images based on at least one of color and concentration of the nucleus, and the setting unit sets the object region based on the nucleus candidate region and a range of possible size of the target cell.

[3] The image processing device according to [1] or [2], may further include: a machine learning unit that mechanically learns a first condition for identifying the target cell and other cells based on a plurality of sample images obtained by imaging a positive example and a negative example of the target cell at a plurality of different focal distances.

[4] The image processing device according to [3], may have a configuration in which the machine learning unit mechanically learns a second condition for identifying the target cell and a specific cell having a difference in change in image information in the focal distance direction from the target cell based on a plurality of sample images obtained by imaging the target cell and the specific cell at a plurality of different focal distances.

[5] The image processing device according to [4], may have a configuration in which the determination unit determines that the target cell is included in the object region when it is determined to be a target cell in the object region under both the first condition and the second condition.

[6] The image processing device according to any one of [1] to [5], may further include: an image selection unit that selects a captured image most focused on the sample from the plurality of captured images, in which the setting unit sets the object region for a captured image at a focal distance with a predefined range from the captured image selected by the image selection unit among the plurality of captured images.

[7] According to another aspect of the invention, it provides a program that causes a computer to function as: an acquisition unit that acquires a plurality of captured images obtained by imaging a sample including a target cell at a plurality of different focal distances; a setting unit that sets an object region for detecting the target cell in at least two of the plurality of captured images; a calculation unit that calculates an image feature quantity based on change in image information in an image in-plane direction and a focal distance direction of an image in the object region in the plurality of captured images; and a determination unit that performs determination about whether or not the target cell is included in the object region based on whether or not the image feature quantity satisfies conditions defined for the target cell.

[8] According to another aspect of the invention, it provides an image processing method that causes a computer to execute a process comprising: acquiring a plurality of captured images obtained by imaging a sample including a target cell at a plurality of different focal distances; setting an object region for detecting the target cell in at least two of the plurality of captured images; calculating an image feature quantity based on change in image information in an image in-plane direction and a focal distance direction of an image in the object region in the plurality of captured images; and performing determination about whether or not the target cell is included in the object region based on whether or not the image feature quantity satisfies conditions defined for the target cell.

[9] According to another aspect of the invention, it provides a non-transitory computer readable medium storing a program causing a computer to execute a process for image processing, the process including: acquiring a plurality of captured images obtained by imaging a sample including a target cell at a plurality of different focal distances; setting an object region for detecting the target cell in at least two of the plurality of captured images; calculating an image feature quantity based on change in image information in an image in-plane direction and a focal distance direction of an image in the object region in the plurality of captured images; and performing determination about whether or not the target cell is included in the object region based on whether or not the image feature quantity satisfies conditions defined for the target cell.

[10] According to another aspect of the invention, it provides an image processing system including: an image processing device; an optical microscope that is connected to the image processing device; and a display device that is connected to the image processing device, in which the image processing device includes an acquisition unit that acquires a plurality of captured images obtained by imaging a sample including a target cell at a plurality of different focal distances, a setting unit that sets an object region for detecting the target cell in at least two of the plurality of captured images, a calculation unit that calculates an image feature quantity based on change in image information in an image in-plane direction and a focal distance direction of an image in the object region in the plurality of captured images, and a determination unit that performs determination about whether or not the target cell is included in the object region based on whether or not the image feature quantity satisfies conditions defined for the target cell.

Advantageous Effects of Invention

According to the configuration (processing) described in [1], [7], [8], [9], and [10], it is possible to improve detection accuracy of a target cell in images obtained by imaging the target cell compared to a case where the shape in a thickness direction of a cell is not used.

According to the configuration described in [2], it is possible to detect a nucleated red blood cell in captured images obtained by imaging a sample including the nucleated red blood cell with high accuracy compared to a case where this configuration is not provided.

According to the configuration described in [3], it is possible to improve detection accuracy of a target cell compared to a case where the result of mechanically learning identification between the target cell and other cells is not used.

According to the configuration described in [4], it is possible to improve detection accuracy of a target cell compared to a case where the result of mechanically learning identification between the target cell and a specific cell is not used.

According to the configuration described in [5], it is possible to improve detection accuracy of a target cell compared to a case where this configuration is not provided.

According to the configuration described in [6], it is possible to obtain a stable image feature even when a cell has variation in thickness.

DESCRIPTION OF EMBODIMENTS

Figure 1:
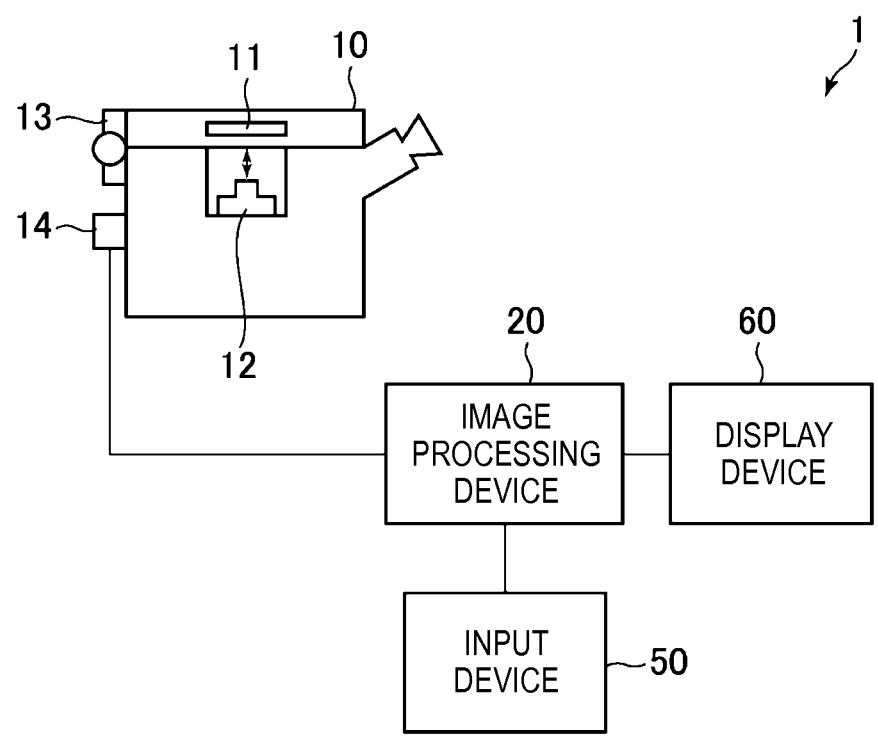
FIG. 1 is a diagram showing a system configuration example of an image processing system according to this embodiment.

Hereinafter, a mode (hereinafter, referred to as an embodiment) for carrying out the invention will be described referring to the drawings.

FIG. 1 shows a system configuration example of an image processing system 1 according to this embodiment. As shown in FIG. 1, the image processing system 1 includes an optical microscope 10, an image processing device 20, an input device 50, and a display device 60. The image processing device 20 and the optical microscope 10, the input device 50, and the display device 60 are connected to perform data communication.

The optical microscope 10 images a sample on a slide glass 11 placed on a sample stand by a CCD camera 14 through an optical system, such as an objective lens 12. The optical microscope 10 includes a focusing mechanism 13 which changes the distance between the slide glass 11 and the objective lens 12, and images the sample on the slide glass 11 at a plurality of different focal distances. In this embodiment, as the sample, a sample in which maternal blood is applied to the slide glass 11 and May-Giemsa staining is performed is used. With this, nucleated red blood cells (NRBCs) derived from a fetus in maternal blood are stained violet-blue. Hereinafter, NRBCs are called target cells.

The image processing device 20 acquires captured images (plural focal images) imaged by the optical microscope 10 at a plurality of different focal distances and detects the target cell in the acquired captured images. The details of detection processing of the target cell in the image processing device 20 will be described below.

The input device 50 is, for example, a device, such as a keyboard or a mouse, and inputs an operation received from a user to the image processing device 20. For example, the image processing device 20 acquires information regarding to an image region designated by the user through the input device 50 in an image displayed on the display device 60 as learning information for learning a positive example and a negative example of the target cell or image information of other specific cells.

The display device 60 is, for example, a liquid crystal display or the like, and displays a screen based on the result of processing by the image processing device 20. For example, the captured images imaged by the optical microscope 10, the detection result of the target cell by the image processing device 20, and the like are displayed on the display device 60.

Next, a function of the image processing device 20 according to this embodiment will be described.

Figure 2:
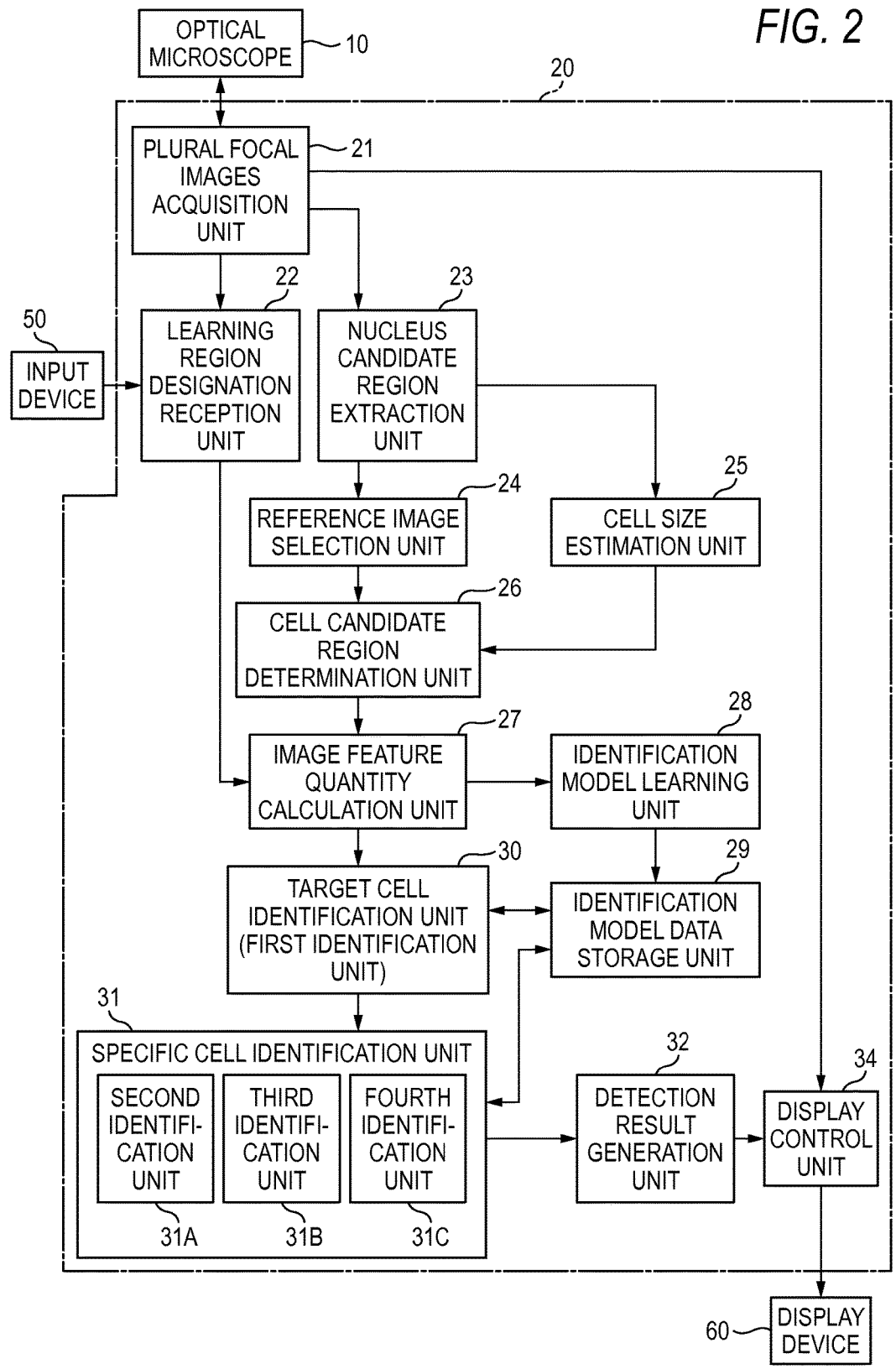
FIG. 2 is a functional block diagram of an image processing device.

FIG. 2 is a functional block diagram of the image processing device 20. As shown in FIG. 2, the image processing device 20 includes a plural focal images acquisition unit 21, a learning region designation reception unit 22, a nucleus candidate region extraction unit 23, a reference image selection unit 24, a cell size estimation unit 25, a cell candidate region determination unit 26, an image feature quantity calculation unit 27, an identification model learning unit 28, an identification model data storage unit 29, a target cell identification unit 30 (first identification unit 30), a specific cell identification unit 31 (a second identification unit 31A, a third identification unit 31B, and a fourth identification unit 31C), a detection result generation unit 32, and a display control unit 33.

The functions of the respective units in the image processing device 20 may be realized when a computer including control means, such as a CPU, storage means, such as a memory, input/output means for transmitting and receiving data to and from an external device, and the like reads and executes a program stored in a computer-readable information recording medium. It should be noted that the program may be supplied to the image processing device 20 as a computer by an information recording medium, such as an optical disk, a magnetic disk, a magnetic tape, a magneto-optical disk, or a flash memory, or may be supplied to the image processing device 20 through a data communication network, such as Internet.

The plural focal images acquisition unit 21 acquires captured images (plural focal images) obtained by imaging the same portion of the sample at a plurality of different focal distances using the CCD camera 14 in the optical microscope 10 from the optical microscope 10. The plurality of different focal distances may be predefined, or may be set by separating the focal distance by a predefined distance before and after from the auto-focus position based on the auto-focus position. It should be noted that images acquired by the plural focal images acquisition unit 21 may be displayed on the display device 60 by the display control unit 33.

The learning region designation reception unit 22 receives designation of an image region for use in learning processing in the images acquired by the plural focal images acquisition unit 21. The designation of the image region may be performed through the input device 50. For example, the learning region designation reception unit 22 receives an image region with a target cell in the captured images as a positive example and receives an image region with no target cell shown in the captured images as a negative example when learning identification between the target cell (nucleated red blood cell) and other images. When learning identification between the target cell and other specific cells (for example, a lymphoid cell, a white blood cell, and a contaminant-attached red blood cell), an image region with the target cell in the captured images may be received as a positive example, and an image region with the specific cell shown in the captured images may be received as a negative example. Then, the learning region designation reception unit 22 may output a three-dimensional image (for example, a rectangular parallelepiped) obtained by cutting the plural focal images separated by the focal distance in a three-dimensional space based on the received image regions to the image feature quantity calculation unit 27 along with information of an identification model for performing learning processing by the image and type information regarding whether the image is a positive example or a negative example.

The nucleus candidate region extraction unit 23 extracts a candidate region of a nucleus based on pixels having color (RGB value) or concentration within a predefined range in each captured image acquired by the plural focal images acquisition unit 21. For example, the nucleus candidate region extraction unit 23 may binarize the pixels in the captured image by a predefined threshold value of color (or concentration), and specifically, may extract pixels having color (or concentration) darker than the threshold value (equal to or greater than the threshold value) as a black pixel. The nucleus candidate region extraction unit 23 may calculate a plurality of sets (pixel groups) by connecting the pixels extracted from each image acquired by the plural focal images acquisition unit 21 and may set a rectangular parallelepiped region circumscribed to each set as a nucleus candidate region.

The reference image selection unit 24 selects the most focused image among the plural focal images acquired by the plural focal images acquisition unit 21 as a reference image. For example, the reference image selection unit 24 may calculate the contrast value of each of the nucleus candidate regions extracted from the plural focal images acquired by the plural focal images acquisition unit 21 and may select the captured image including the nucleus candidate region with the highest contrast as a reference image.

The cell size estimation unit 25 estimates the possible range of a cell size based on the projection size of the nucleus candidate region extracted by the nucleus candidate region extraction unit 23 onto the slide glass surface and a predefined relational expression. For example, the cell size estimation unit 25 may estimate the possible range (for example, a rectangular region) of the nucleated red blood cell on the slide glass surface based on a relational expression between a nucleus in the nucleated red blood cell and a cell size. Specifically, the cell size estimation unit 25 sets the rectangular region in the estimated range centering on one point in the nucleus candidate region as a cell presence region.

The cell candidate region determination unit 26 determines a cell candidate region likely to include a target cell in the plural focal images based on the nucleus candidate region extracted by the nucleus candidate region extraction unit 23, the reference image selected by the reference image selection unit 24, and the cell presence region on the slide glass surface estimated by the cell size estimation unit 25. For example, the cell candidate region determination unit 26 may determine a three-dimensional image (for example, a rectangular parallelepiped) having the cell presence region on the slide glass surface estimated by the cell size estimation unit 25 a captured image group within a predefined focal distance from the captured image selected by the reference image selection unit 24 as a cell candidate region. The cell candidate region determination unit 26 determines a cell candidate region for each of a plurality of nucleus candidate regions and outputs plural focal images in the determined cell candidate region to the image feature quantity calculation unit 27.

The image feature quantity calculation unit 27 enlarges or reduces the plural focal images input from the learning region designation reception unit 22 or the cell candidate region determination unit 26 to a designated image size and then calculates the image feature quantity of the images. For example, the image feature quantity calculation unit 27 calculates the image feature quantity from the input plural focal images and outputs the calculated image feature quantity to the identification model learning unit 28 when the plural focal images are input from the learning region designation reception unit 22, and calculates the image feature quantity from the input plural focal images and outputs the calculated image feature quantity to the target cell identification unit 30 when the plural focal images are input from the cell candidate region determination unit 26. Hereinafter, an example (first to third examples) of the image feature quantity calculated by the image feature quantity calculation unit 27 will be described.

In the first example, the image feature quantity calculation unit 27 calculates a Histograms of Oriented Gradients feature (HOG feature) of each input focal image and calculates a vector obtained by combining the HOG features in an order of focus (that is, an order of shorter focal distance or an opposite order) as an image feature quantity. It should be noted that, in regard to the HOG feature, a calculation method described in Navneet Dalal and Bill Triggs, "Histograms of Oriented Gradients for Human Detection", In CVPR, pp. 886-893, 2005 may be used.

In the second example, the image feature quantity calculation unit 27 creates each difference image between two focal images at a short focal distance (that is, adjacent) among the input plural focal images, calculates the HOG feature from each created difference image, and calculates a result of combining the features in an order of focal distance as an image feature quantity.

In the third example, the image feature quantity calculation unit 27 calculates the HOG features expanded in a three-dimensional manner based on the input plural focal images as an image feature quantity. In regard to normal (two-dimensional) HOG features, an object image is divided into B blocks each having A cells, luminance gradient direction histograms ([the value of a first gradient direction, the value of a second gradient direction, . . . , the value of an N-th gradient direction]) are created from the luminance gradient direction and luminance gradient intensity in the plane (X direction and Y direction) of an image for the respective cells of each block, and normalization is performed in units of blocks such that the square means of the luminance gradient direction histograms becomes 1. Thereafter, A×N values created by combining the normalized luminance gradient direction histograms in the block are set as the feature quantities of the block, and A×B×N values created by combining the blocks in the object image are set as the HOG feature quantities of the object image.

In this embodiment, the HOG features expanded in a three-dimensional manner adds the focal distance direction (Z direction) to the luminance gradient direction, in addition to the X direction and Y direction in the plane of the image. The luminance gradient direction of the Z direction is calculated based on the difference between the plural focal images. Each cell is a three-dimensional rectangular parallelepiped, the three-dimensional luminance gradient direction and intensity are calculated for each cell, the histogram is calculated from the luminance gradient direction and intensity calculated for each cell, and the three-dimensional HOG feature is calculated based on the calculated histogram. It should be noted that, if the number of divisions of a three-dimensional region as an object in the Z direction is C, A×B×C cells are used to calculate an image feature quantity.

The identification model learning unit 28 performs learning of the respective identification units based on information (first to fourth identification units) of identification units (identification models) of the plural focal images input to the image feature quantity calculation unit 27 by the learning region designation reception unit 22, type information of a positive example and a negative example, and the image feature quantity calculated for the plural focal images. Specifically, in regard to the first identification unit 30 (target cell identification unit 30), the identification model learning unit 28 generates model parameters with an image feature quantity of plural focal images of a target cell as a positive example and an image feature quantity of other plural focal images as a negative example. In regard to the second identification unit, the identification model learning unit 28 generates model parameters with the image feature quantity of the plural focal images of the target cell as a positive example and an image feature quantity of plural focal images of a lymphoid cell as a negative example. In regard to the third identification unit, the identification model learning unit 28 generates model parameters with the image feature quantity of the plural focal images of the target cell as a positive example and an image feature quantity of plural focal images of a cell (for example, white blood cell) having an aspect ratio different from the target cell as a negative example. In regard to the fourth identification unit, the identification model learning unit 28 generates model parameters with the image feature quantity of the plural focal images of the target cell as a positive example and an image feature quantity of plural focal images of a contaminant-attached cell (for example, red blood cell) as a negative example. It should be noted that a machine learning model, such as AdaBoost or Support Vector Machine, may be used for the first to fourth identification units.

The identification model data storage unit 29 stores the model parameters of the respective identification units generated by the identification model learning unit 28.

The target cell identification unit 30 (first identification unit 30) identifies whether or not a cell included in a cell candidate region is a target cell based on the image feature quantity calculated for the plural focal images related to the cell candidate region determined by the cell candidate region determination unit 26 and the model parameters related to the first identification unit 30 stored in the identification model data storage unit 29.

The specific cell identification unit 31 identifies whether a cell included in the cell candidate region is a target cell or a specific cell which is likely to be erroneously recognized to be a target cell. If the target cell is a nucleated red blood cell, the specific cell is a lymphoid cell, a large-sized white blood cell, a contaminant-attached red blood cell, or the like. Here, FIGS. 3A to 3D show examples of images obtained by imaging a target cell and a specific cell while changing a focal distance.

Figure 3A:
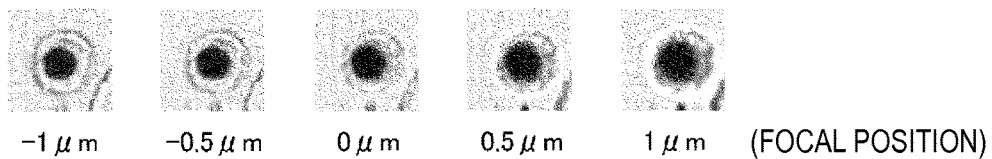
FIG. 3A shows an example of images obtained by imaging a target cell and a specific cell while changing a focal distance.

FIG. 3A shows an example of plural focal images obtained by imaging a nucleated red blood cell while changing the focal distance to −1 μm, −0.5 μm, 0 μm (auto-focus position), +0.5 μm, and +1 μm centering on the auto-focus position.

Figure 3B:
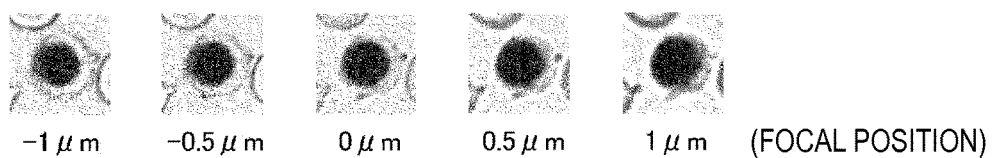
FIG. 3B shows an example of images obtained by imaging a target cell and a specific cell while changing a focal distance.

FIG. 3B shows an example of plural focal images obtained by imaging a lymphoid cell while changing the focal distance to −1 μm, −0.5 μm, 0 μm (auto-focus position), +0.5 μm, and +1 μm centering on the auto-focus position.

Figure 3C:
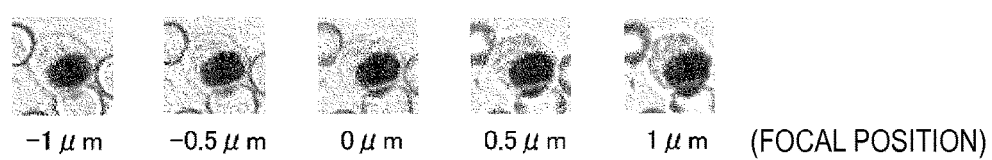
FIG. 3C shows an example of images obtained by imaging a target cell and a specific cell while changing a focal distance.

FIG. 3C shows an example of plural focal images obtained by imaging a large-sized white blood cell while changing the focal distance to −1 μm, −0.5 μm, 0 μm (auto-focus position), +0.5 μm, and +1 μm centering on the auto-focus position.

Figure 3D:
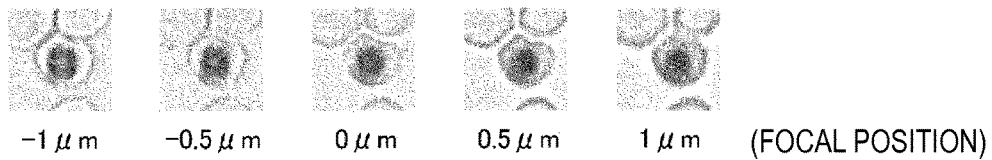
FIG. 3D shows an example of images obtained by imaging a target cell and a specific cell while changing a focal distance.

FIG. 3D shows an example of plural focal images obtained by imaging a contaminant-attached red blood cell while changing the focal distance to −1 μm, −0.5 μm, 0 μm (auto-focus position), +0.5 μm, and +1 μm centering on the auto-focus position.

In the examples shown in FIGS. 3A to 3D, for example, it is difficult to discriminate the image of +1 μm of FIG. 3A from the images of −1 μm of FIG. 3B, +1 μm of FIG. 3C, −1 μm of the FIG. 3D, and the like, and when comparing the respective images, erroneous recognition is likely to occur. However, each cell undergoes the following change in the image when the focal distance changes.

As shown in FIG. 3A, the nucleated red blood cell changes in the area of the nucleus portion if the focal distance changes. As shown in FIG. 3B, since the lymphoid cell has a large nucleus area, even if the focal distance changes, change in the area of the nucleus portion is small compared to the nucleated red blood cell. As shown in FIG. 3C, since the large-sized white blood cell has large viscosity, the cell is crushed, the size in the thickness direction is small, the aspect ratio is large, and even if the focus changes, the image hardly changes. As shown in FIG. 3D, since the contaminant-attached red blood cell has contaminant attached to the upper portion of the cell, the image is clear when the focus is on a near side and is not clear when the focus on a deep side.

Accordingly, in this embodiment, image change when changing the focal distance is learned and is used for identification, thereby improving identification accuracy between a target cell and a specific cell.

The specific cell identification unit 31 has a function of learning identification between a target cell and a specific cell. Hereinafter, the details of the configuration of the specific cell identification unit 31 will be described. As shown in FIG. 2, the specific cell identification unit 31 has second to fourth identification units. Hereinafter, the second to fourth identification units will be described.

The second identification unit 31A identifies whether a cell included in the cell candidate region is a target cell or a lymphoid cell based on the image feature quantity calculated in the plural focal images related to the cell candidate region determined by the cell candidate region determination unit 26 and the model parameters related to the second identification unit stored in the identification model data storage unit 29.

The third identification unit 31B identifies whether a cell included in the cell candidate region is a target cell or a cell (for example, white blood cell) having a different aspect ratio based on the image feature quantity calculated in the plural focal images related to the cell candidate region determined by the cell candidate region determination unit 26 and the model parameters related to the third identification unit stored in the identification model data storage unit 29.

The fourth identification unit 31C identifies whether a cell included in the cell candidate region is a target cell or a contaminant-attached cell (for example, red blood cell) based on the image feature quantity calculated in the plural focal images related to the cell candidate region determined by the cell candidate region determination unit 26 and the model parameters related to the fourth identification unit stored in the identification model data storage unit 29.

In this embodiment, even if the specific cell identification unit 31 includes the second identification unit 31A, the third identification unit 31B, and the fourth identification unit 31C, and it is identified in the target cell identification unit 30 that the target cell is included, when it is identified in one, two, or all of the second to fourth identification units that a cell included in the cell candidate region is a specific cell, not a target cell, determination that the target cell is detected may not be made. It should be noted that, when the specific cell identification unit 31 is not provided, the target cell may be detected only based on the identification result by the target cell identification unit 30.

The detection result generation unit 32 generates an image region including the cell candidate region detected to be the target cell based on the processing result of the target cell identification unit 30 and the specific cell identification unit 31 and information of the coordinate of the image region. A control signal for controlling the optical microscope 10 may be output to the optical microscope 10 such that the imaging range of the optical microscope 10 is moved to the coordinate generated by the detection result generation unit 32.

The display control unit 33 outputs display control information for displaying the image region and the coordinate generated by the detection result generation unit 32 to the display device 60. With this, the image region and the coordinate detected to be the target cell are displayed on the display device 60.

Next, the flow of processing in the image processing device 20 will be described referring to the flowcharts shown in FIGS. 4 to 6.

[Learning Processing]

Figure 4:
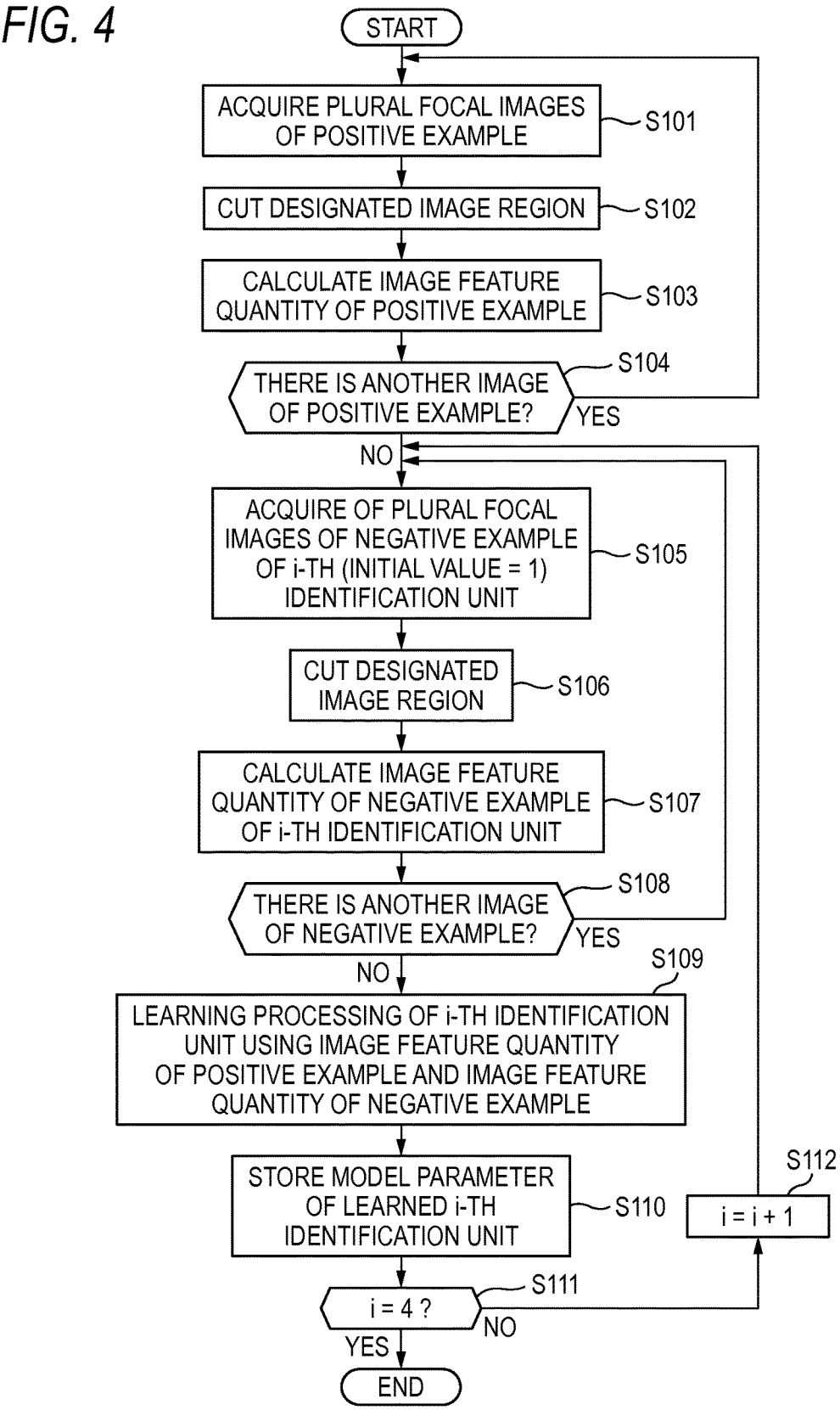
FIG. 4 is a flowchart of learning processing of first to fourth identification units.

FIG. 4 is a flowchart showing learning processing of the first to fourth identification units. As shown in FIG. 4, the image processing device 20 acquires plural focal images (that is, images including a target cell) of a positive example (S101), and cuts a designated image region (that is, an image region corresponding to the target cell) in the acquired plural focal images (S102). The image processing device 20 calculates the image feature quantity of the positive example based on the cut image regions of the plural focal images (S103). As described above, the image feature quantity is calculated as data having three-dimensional elements in the image in-plane direction and the focal distance direction. When there is another image of the positive example to be learned (S104: Y), the image processing device 20 returns to S101, and when there is no another image of the positive example to be learned (S104: N), the image processing device 20 progresses to S105.

The image processing device 20 acquires plural focal images of a negative example in an i-th (an initial value of i=1) identification unit (S105), and cuts a designated image region (that is, an image region corresponding to a cell of a negative example) in the acquired plural focal images (S106). The image processing device 20 calculates the image feature quantity of the negative example of the i-th identification unit based on the cut image regions of the plural focal images (S107). When there is another image of the negative example of the i-th identification unit to be learned (S108: Y), the image processing device 20 returns to S105, and when there is no another image of the negative example of the i-th identification unit to be learned (S108: N), the image processing device 20 progresses to S109.

The image processing device 20 executes the learning processing of the i-th identification unit using the image feature quantity of the positive example and the image feature quantity of the negative example obtained by the above-described processing (S109), and stores the model parameters of the i-th identification unit obtained by the learning processing (S110).

When there is another identification unit to be learned, that is, in this embodiment, when i=4 is not satisfied (S111: N), the image processing device 20 increments i (S112) and returns to S105. When there is no another identification unit to be learned, that is, in this embodiment, when i=4 (S111: Y), the learning processing ends.

[Flow of Detection Processing of Target Cell]

Next, the flow of processing for detecting a target cell will be described referring to the flowchart shown in FIG. 5.

Figure 5:
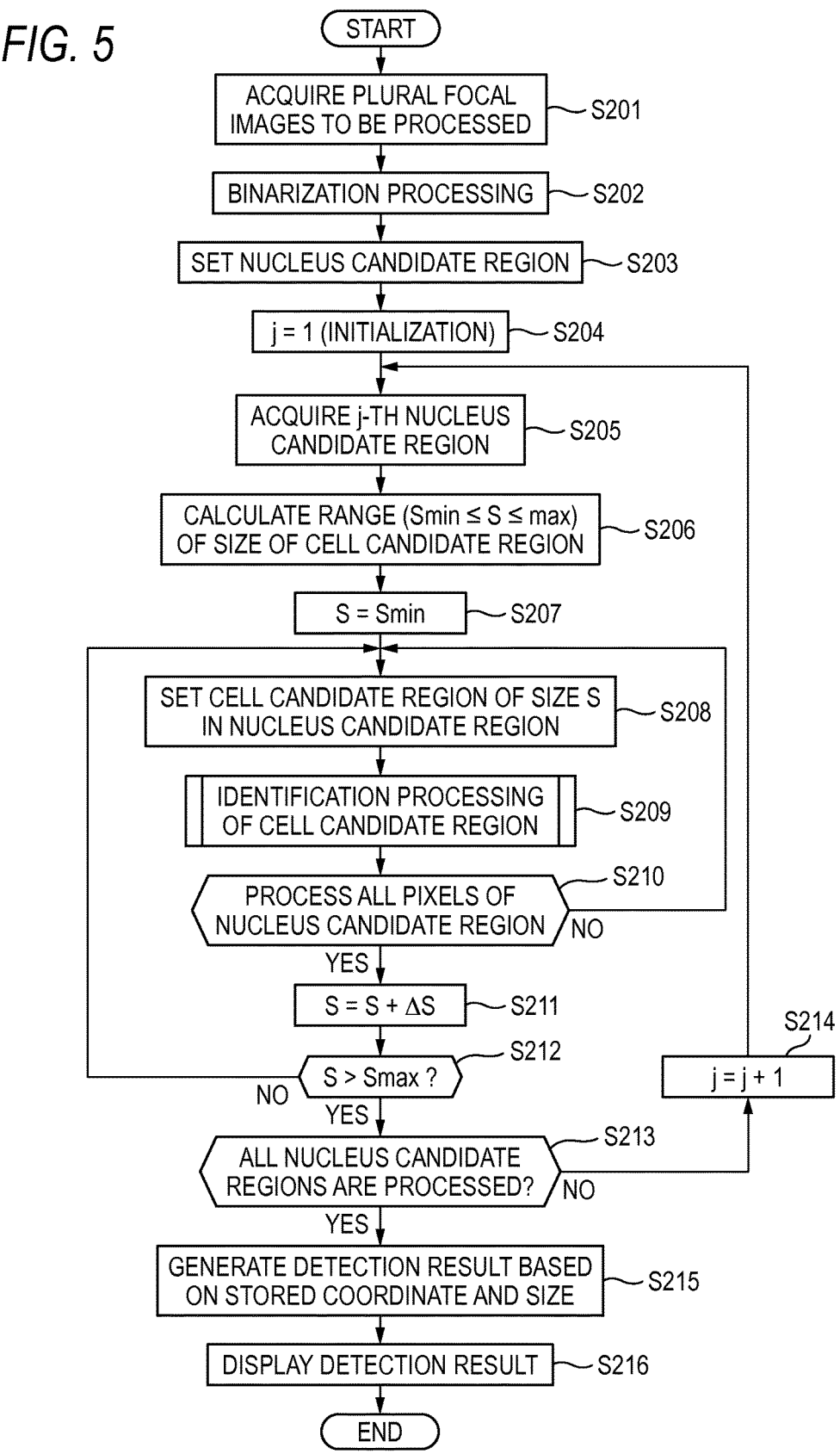
FIG. 5 is a flowchart of processing for detecting a target cell.

As shown in FIG. 5, the image processing device 20 acquires plural focal images to be processed (S201) and executes binarization processing on the acquired plural focal images (S202). Next, the image processing device 20 sets possible nucleus candidate regions (N) of the nucleus of the target cell in the plural focal images after the binarization processing (S203).

The image processing device 20 initializes a variable j to 1 (S204), acquires a j-th nucleus candidate region (S205), and calculates a possible range ($S_{min} \leq S \leq S_{max}$) of a cell size S based on the projection size of the acquired nucleus candidate region onto the slide glass surface and a predefined relational expression (S206).

The image processing device 20 sets the initial value of S to the minimum value (Smin) (S207), sets the cell candidate region of the size S in the j-th nucleus candidate region (S208), and executes identification processing (identification processing of the cell candidate region) about whether or not the target cell is included in the set cell candidate region (S209). The flow of the identification processing of the cell candidate region will be described below.

When all pixels of the nucleus candidate region are not processed (S210: N), the image processing device 20 returns to S208 and continues the processing. When all pixels of the nucleus candidate region are processed (S210: Y), the image processing device 20 increases the cell size S by ΔS (ΔS may be predefined or may be set by multiplying S by a predefined ratio) (S211). When the cell size S is not greater than the maximum value (Smax) of the cell size (S212: N), image processing device 20 returns to S208 and continues the processing.

When the cell size S is greater than the maximum value (Smax) of the cell size (S212: Y), the image processing device 20 performs determination about whether all nucleus candidate regions are processed (that is, whether or not j=N) (S213). Here, when all nucleus candidate regions are not processed (S213: N), the image processing device 20 increments j (S214), returns to S205, and continues the processing. When all nucleus candidate regions are processed (S213: Y), the image processing device 20 generates a detection result based on the coordinate and size of the detected target cell (S215). Then, the image processing device 20 displays the target cell on the display device 60 based on the generated detection result (S216).

[Flow of Identification Processing of Cell Candidate Region]

The details of the identification processing of the cell candidate region in the above-described flow will be described referring to the flowchart shown in FIG. 6.

Figure 6:
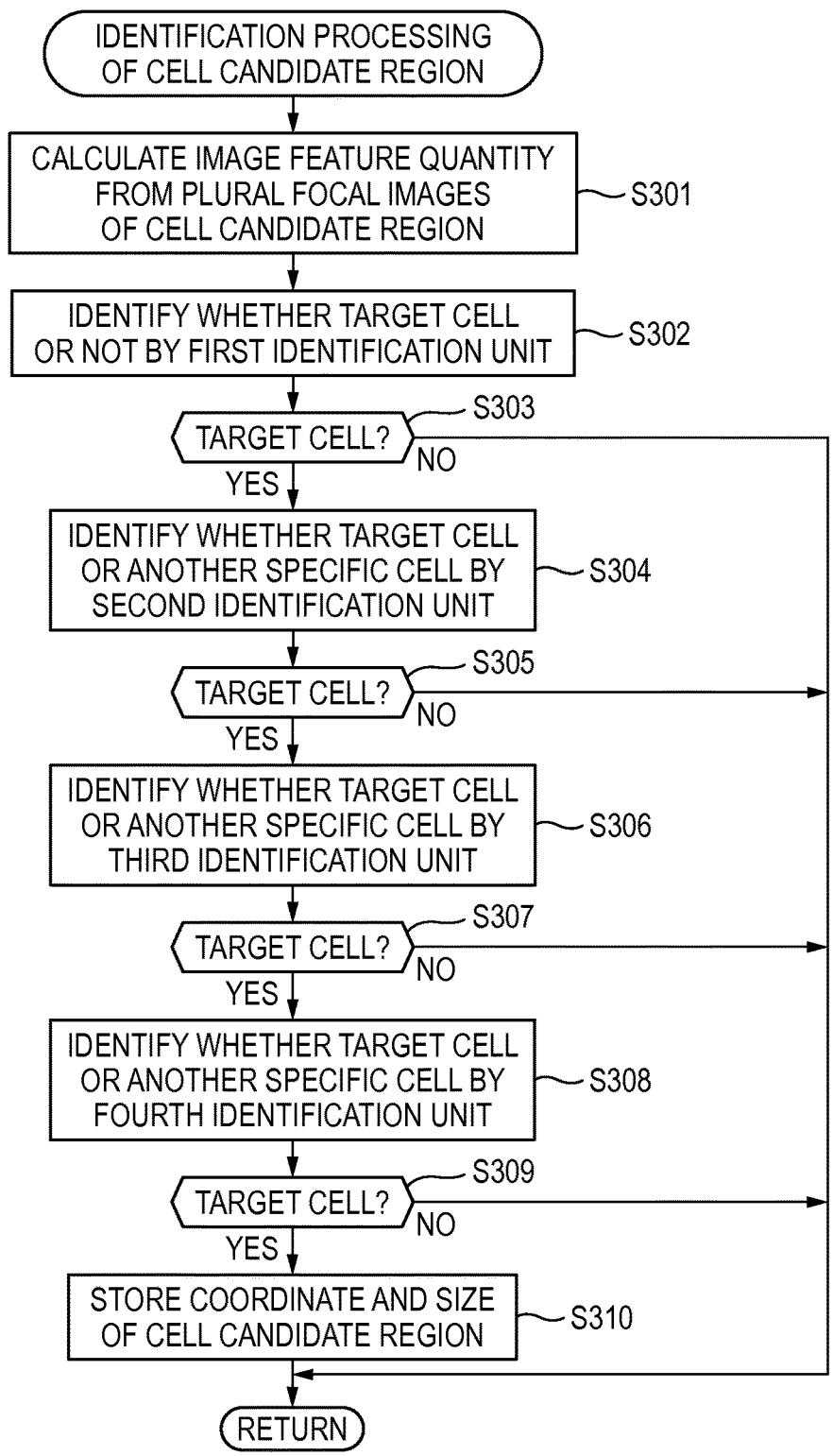
FIG. 6 is a flowchart of identification processing of a cell candidate region.

As shown in FIG. 6, the image processing device 20 calculates an image feature quantity based on the plural focal images in the cell candidate region (S301). Then, the image processing device 20 identifies whether or not to be the target cell (nucleated red blood cell) by the first identification unit 30 based on the image feature quantity calculated in S301 (S302), and performs return when it is identified to be not the target cell (S303: N).

When it is identified to be the target cell by the first identification unit 30 (S303: Y), the image processing device 20 identifies whether or not to be the target cell (nucleated red blood cell) based on the image feature quantity calculated in S301 by the second identification unit 31A (S304). When it is identified to be not the target cell (S305: N), the image processing device 20 performs return.

When it is identified to be the target cell by the second identification unit 31A (S305: Y), the image processing device 20 identifies whether or not to be the target cell (nucleated red blood cell) based on the image feature quantity calculated in S301 by the third identification unit 31B (S306), and performs return when it is identified to be not the target cell (S307: N).

When it is identified to be the target cell by the third identification unit 31B (S307: Y), the image processing device 20 identifies whether or not to be the target cell (nucleated red blood cell) based on the image feature quantity calculated in S301 by the fourth identification unit 31C (S308), and performs return when it is identified to be not the target cell (S309: N).

When it is identified to be the target cell by the fourth identification unit 31C (S309: Y), the image processing device 20 determines that there is the target cell in the cell candidate region, stores the coordinate and size of the cell candidate region (S310), and performs return.

According to the image processing system 1 described above, the image feature quantity is calculated based on change in image information in the focal distance direction as well as the image in-plane direction using a plurality of captured images obtained by imaging a sample including a cell at a plurality of different focal distances, whereby it is possible to improve detection accuracy of the target cell in the captured images compared to a case where information regarding the shape of the cell in the thickness direction is not used.

The invention is not limited to the above-described embodiment. For example, the most focused image among the plural focal images for use in learning may be selected as a reference image and the image feature quantity may be calculated based on the selected reference image.

INDUSTRIAL APPLICABILITY

The image processing device, the image processing method, the computer-readable medium, and the image processing system according to the invention are useful for mechanically detecting the cells of NRBCs.

Although the invention has been described in detail or referring to the specific embodiment, it is apparent to those skilled in the art that various changes and modifications can be added without departing from the spirit and scope of the invention.

This application is based on Japanese Patent Application No. 2012-184864, filed on Aug. 24, 2012, the content of which is incorporated herein by reference.

REFERENCE SIGNS LIST

1: image processing system, 10: optical microscope, 11: slide glass, 12: objective lens, 13: focusing mechanism, 14: CCD camera, 20: image processing device, 21: plural focal images acquisition unit, 22: learning region designation reception unit, 23: nucleus candidate region extraction unit, 24: reference image selection unit, 25: cell size estimation unit, 26: cell candidate region determination unit, 27: image feature quantity calculation unit, 28: identification model learning unit, 29: identification model data storage unit, 30: target cell identification unit (first identification unit), 31: specific cell identification unit, 31A: second identification unit, 31B: third identification unit, 31C: fourth identification unit, 32: detection result generation unit, 33: display control unit, 50: input device, 60: display device

The invention claimed is:

1. An image processing apparatus comprising:
   at least one hardware processor configured to implement:
   a setting unit configured to set an object region for detecting a target cell in each of a plurality of captured images obtained by imaging a sample including the target cell at a plurality of different focal distances;
   a calculation unit configured to calculate a Histograms of Oriented Gradients (HOG) feature quantity in each of the plurality of captured images based on a luminance gradient direction and intensity in the object region and to calculate a vector obtained by combining the calculated HOG feature quantities as an image feature quantity; and a determination unit configured to determine whether the target cell is included in the object region based on whether the image feature quantity satisfies conditions defined for the target cell.

2. An image processing apparatus comprising:
at least one hardware processor configured to implement:
a setting unit configured to set an object region for detecting a target cell in each of a plurality of captured images obtained by imaging a sample including the target cell at a plurality of different focal distances;
a calculation unit configured to calculate a Histograms of Oriented Gradients (HOG) feature quantity in each difference image between two captured images adjacent in focal distance among the plurality of captured images based on a luminance gradient direction and intensity in the object region and to calculate a vector obtained by combining the calculated HOG feature quantities as an image feature quantity; and
a determination unit configured to determine whether the target cell is included in the object region based on whether the image feature quantity satisfies conditions defined for the target cell.

3. An image processing apparatus comprising:
at least one hardware processor configured to implement:
a setting unit configured to set an object region for detecting a target cell in each of a plurality of captured images obtained by imaging a sample including the target cell at a plurality of different focal distances;
a calculation unit configured to calculate a three-dimensional Histograms of Oriented Gradients (HOG) feature quantity as an image feature quantity based on a three-dimensional luminance gradient direction having an in-plane direction and a focal distance direction of the plurality of captured images in the object region and intensity; and
a determination unit configured to determine whether the target cell is included in the object region based on whether the image feature quantity satisfies conditions defined for the target cell.

4. The image processing apparatus according to claim 1, wherein the target cell is a nucleated red blood cell having a nucleus,
the at least one hardware processor is further configured to implement:
an extraction unit configured to extract a nucleus candidate region to be a candidate of the nucleus from the plurality of captured images based on at least one of color and concentration of the nucleus, and
the setting unit is further configured to set the object region based on the nucleus candidate region and a range of possible size of the target cell.

5. The image processing apparatus according to claim 1, wherein the at least one hardware processor configured to implement:
a machine learning unit configured to mechanically learn a first condition for identifying the target cell and other cells based on a plurality of sample images obtained by imaging a positive example and a negative example of the target cell at a plurality of different focal distances.

6. The image processing apparatus according to claim 5, wherein the machine learning unit is further configured to mechanically learn a second condition for identifying the target cell and a specific cell having a difference in change in image information in at least the focal distance direction from the target cell based on a plurality of sample images obtained by imaging the target cell and the specific cell at a plurality of different focal distances.

7. The image processing apparatus according to claim 2, wherein the target cell is a nucleated red blood cell having a nucleus,
the at least one hardware processor configured to implement:
an extraction unit configured to extract a nucleus candidate region to be a candidate of the nucleus from the plurality of captured images based on at least one of color and concentration of the nucleus, and
the setting unit is further configured to set the object region based on the nucleus candidate region and a range of possible size of the target cell.

8. The image processing apparatus according to claim 2, wherein the at least one hardware processor configured to implement:
a machine learning unit configured to mechanically learn a first condition for identifying the target cell and other cells based on a plurality of sample images obtained by imaging a positive example and a negative example of the target cell at a plurality of different focal distances.

9. The image processing apparatus according to claim 8, wherein the machine learning unit is further configured to mechanically learn a second condition for identifying the target cell and a specific cell having a difference in change in image information in at least the focal distance direction from the target cell based on a plurality of sample images obtained by imaging the target cell and the specific cell at a plurality of different focal distances.

10. The image processing apparatus according to claim 6, wherein the determination unit is further configured to determine that the target cell is included in the object region when it is determined to be a target cell in the object region under both the first condition and the second condition.

11. The image processing apparatus according to claim 1, wherein the at least one hardware processor configured to implement:
an image selection unit configured to select a captured image most focused on the sample from the plurality of captured images,
wherein the setting unit is further configured to set the object region for a captured image at a focal distance with a predefined range from the captured image selected by the image selection unit among the plurality of captured images.

12. An image processing method that causes a computer to execute a process comprising:
setting an object region for detecting a target cell in each of a plurality of captured images obtained by imaging a sample including the target cell at a plurality of different focal distances;
calculating a Histograms of Oriented Gradients (HOG) feature quantity in each of the plurality of captured images based on a luminance gradient direction and intensity in the object region and calculating a vector obtained by combining the calculated HOG feature quantities as an image feature quantity; and determining whether the target cell is included in the object region based on whether the image feature quantity satisfies conditions defined for the target cell.

13. An image processing method that causes a computer to execute a process comprising:

setting an object region for detecting a target cell in each of a plurality of captured images obtained by imaging a sample including the target cell at a plurality of different focal distances;

calculating a Histograms of Oriented Gradients (HOG) feature quantity in each difference image between two captured images adjacent in focal distance among the plurality of captured images based on a luminance gradient direction and intensity in the object region and calculating a vector obtained by combining the calculated HOG feature quantities as an image feature quantity; and determining whether the target cell is included in the object region based on whether the image feature quantity satisfies conditions defined for the target cell.

14. An image processing method that causes a computer to execute a process comprising:

setting an object region for detecting a target cell in each of a plurality of captured images obtained by imaging a sample including the target cell at a plurality of different focal distances;

calculating a three-dimensional Histograms of Oriented Gradients (HOG) feature quantity as an image feature quantity based on a three-dimensional luminance gradient direction having an in-plane direction and a focal distance direction of the plurality of captured images in the object region and intensity; and determining whether the target cell is included in the object region based on whether the image feature quantity satisfies conditions defined for the target cell.

15. A non-transitory computer readable medium storing a program causing a computer to execute a process for image processing, the process comprising:

setting an object region for detecting a target cell in each of a plurality of captured images obtained by imaging a sample including the target cell at a plurality of different focal distances;

calculating a Histograms of Oriented Gradients (HOG) feature quantity in each of the plurality of captured images based on a luminance gradient direction and intensity in the object region and calculating a vector obtained by combining the calculated HOG feature quantities as an image feature quantity; and determining whether the target cell is included in the object region based on whether or not the image feature quantity satisfies conditions defined for the target cell.

16. A non-transitory computer readable medium storing a program causing a computer to execute a process for image processing, the process comprising:

setting an object region for detecting a target cell in each of a plurality of captured images obtained by imaging a sample including the target cell at a plurality of different focal distances;

calculating a Histograms of Oriented Gradients (HOG) feature quantity in each difference image between two captured images adjacent in focal distance among the plurality of captured images based on a luminance gradient direction and intensity in the object region and calculating a vector obtained by combining the calculated HOG feature quantities as an image feature quantity; and determining whether the target cell is included in the object region based on whether the image feature quantity satisfies conditions defined for the target cell.

17. A non-transitory computer readable medium storing a program causing a computer to execute a process for image processing, the process comprising:

setting an object region for detecting a target cell in each of a plurality of captured images obtained by imaging a sample including the target cell at a plurality of different focal distances;

calculating a three-dimensional Histograms of Oriented Gradients (HOG) feature quantity as an image feature quantity based on a three-dimensional luminance gradient direction having an in-plane direction and a focal distance direction of the plurality of captured images in the object region and intensity; and determining whether the target cell is included in the object region based on whether the image feature quantity satisfies conditions defined for the target cell.

* * * * *